United States Patent [11] 3,629,501

[72] Inventor Adriaan Cense
Nijmegen, Netherlands

[21] Appl. No. 866,946
[22] Filed Oct. 16, 1969
[45] Patented Dec. 21, 1971
[73] Assignee U.S. Philips Corporation
New York, N.Y.
[32] Priority Oct. 16, 1969
[33] Netherlands
[31] 6815053

[54] SYNCHRONIZING SEPARATOR FOR SEPARATING SYNCHRONIZING PULSES FROM A COMPOSITE VIDEO SIGNAL
6 Claims, 3 Drawing Figs.

[52] U.S. Cl. .......... 178/7.3 S, 328/139, 328/175
[51] Int. Cl. .......... H04n 5/10
[50] Field of Search .......... 178/7.3 S, 7.5 S, DIG. 12; 307/237; 328/139, 169, 173, 175

[56] References Cited

UNITED STATES PATENTS

| | | | |
|---|---|---|---|
| 2,864,888 | 12/1958 | Goodrich .......... | 178/7.3 |
| 2,776,338 | 1/1957 | Avins .......... | 178/7.3 |
| 3,038,027 | 6/1962 | St. John .......... | 178/7.3 |
| 3,256,502 | 6/1966 | Momberger .......... | 178/6 |
| 3,240,873 | 3/1966 | Hansen et al. .......... | 178/7.3 |

FOREIGN PATENTS

| | | | |
|---|---|---|---|
| 959,694 | 6/1964 | Great Britain .......... | |

*Primary Examiner*—Richard Murray
*Assistant Examiner*—Peter M. Pecori
*Attorney*—Frank R. Trifari

ABSTRACT: A synchronization signal separator has an amplitude limiter followed by a clipper stage. An RC network has a time constant longer than the line period, but shorter than the field period, and is coupled to the limiter and clipper by resistors. This causes feedback that prevents the circuit from operating on the vertical sync pulses.

Figure 1:
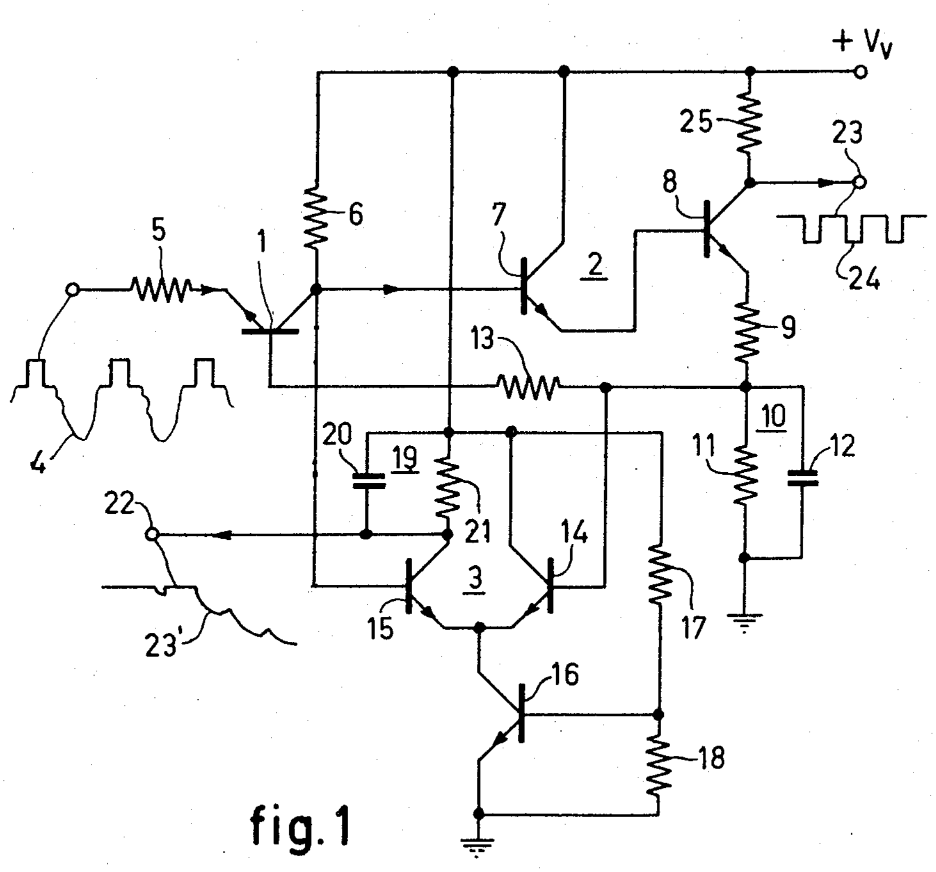

INVENTOR.
ADRIAAN CENSE
BY
Frank R. Trifari
AGENT

INVENTOR.
ADRIAAN CENSE
BY
Frank R. Trifari
AGENT

SYNCHRONIZING SEPARATOR FOR SEPARATING SYNCHRONIZING PULSES FROM A COMPOSITE VIDEO SIGNAL

The invention relates to a synchronizing separator for separating synchronizing pulses from a composite video signal which includes at least both line- and field-synchronizing pulses, the separator including an amplitude limiter to an input electrode of which the video signal is applied and an output electrode of which is coupled to an output of the separator, and including an RC network having a comparatively small time constant relative to the period of the field-synchronizing pulses.

Such a synchronizing separator is known from British Pat. specification No. 959,694. The use of the small time constant of the RC network in this known separator is necessary to ensure that in case of quick variations in the amplitude of the input signal the threshold voltage which is developed across the capacitor can follow these quick variations. If this is not the case the amplitude limiter will not be able to fulfill its task satisfactorily when the amplitude of the received video signal is reduced and video information will appear in the separated synchronizing signal. This influences the synchronization in an unfavorable sense.

The quick variations of the amplitude of the input signal may be a result of so-called air flutter (fly-by of an airplane which reflects the television signal originating from a transmitter to the aerial to which a television receiver is connected so that this reflected signal at one instant is in phase and a short instant later is in phase opposition with the signal received on the aerial directly from the transmitter). The automatic gain control circuit in the television receiver cannot follow these quick variations resulting in the amplitude of the detected video signal being also liable to variations.

This phenomenon may also occur when using so-called automatic gain control circuits. As is known the control voltage supplied by the automatic gain control circuit will drop out upon the occurrence of an out-of-synchronization condition and the amplitude of the video signal will suddenly increase. This increased signal may again generate an automatic gain control voltage, for example, in dark parts of the picture so that the amplitude of the video signal decreases again. If the receiver is then still in its out-of-synchronization condition the amplitude of the video signal subsequently increases again. The speed of these variations is dependent on the time constant of the smoothing network in the automatic gain control circuit. The time constant of the RC network in the synchronizing separator is to be shorter than the time constant of the smoothing network in the automatic gain control circuit since otherwise the synchronizing separator cannot follow variations in the video signal as a result of the last-mentioned cause.

As described in British Pat. specification No. 959,694 the reduction of a time constant has, however, the result that the threshold voltage across the capacitor in the RC network of the synchronizing separator greatly varies during the field-synchronizing pulses occurring in the field-synchronizing interval, which pulses have a much broader duration than the line or equalizing pulses. As a result the amplitude of the separated synchronizing pulses also varies. This causes a variation of the control voltage during the period of occurrence of the field-synchronizing pulses which control voltage is supplied by a phase discriminator in the line deflection section. As a result the picture is askew directly after finishing the field-synchronizing pulses (visible on the upper side of the screen of the picture tube). This is undesirable.

In order to obviate this skew picture the synchronizing separator according to the invention is characterized in that the output electrode of the amplitude limiter is coupled to the said output through a clipper stage which includes at least a transistor and in which the output electrode of the amplitude limiter is DC connected to a base of the transistor whose emitter is DC connected to the said RC network and to a biasing electrode of the amplitude limiter, the collector of said transistor, which is connected to an output resistor, forming the output of the separator.

It is to be noted that due to the manner of connecting the synchronizing separator, field-synchronizing pulses do not become available at its normal output. It is of course possible to manufacture a completely separate separator for the separation of the field-synchronizing pulses, but this requires many extra components.

According to a further principle of the invention it is, however, possible to realize the separation of the field-synchronizing pulses in the same separator if this is characterized in that for separately separating the field-synchronizing pulses two further transistors connected as differential amplifiers are incorporated in the separator, the base of the first transistor being DC connected to the RC network and the base of the second transistor being DC connected to the output electrode of the amplitude limiter and the collector of the second transistor forming a second output from which the field-synchronizing pulses can be derived.

Figure 2:
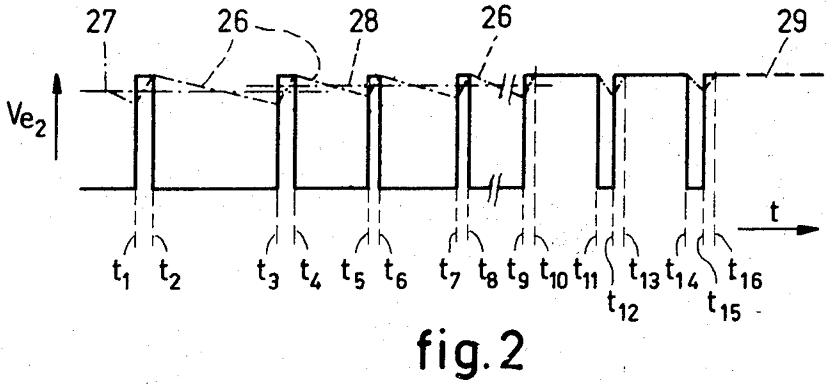

A possible embodiment of a synchronizing separator according to the invention will now be described by way of example with reference to the accompanying diagrammatic drawings in which:

FIG. 1 shows the synchronizing separator according to the invention,

FIG. 2 shows separated synchronizing pulses including the ripple voltage across the RC network without the step according to the invention, FIG. 3*a* shows the video signal including the ripple voltage superimposed thereon as it is active at the amplitude limiter in the circuit arrangement of FIG. 1, FIG. 3*b* shows the collector current of the amplitude limiter of FIG. 1, FIG. 3*c* shows the collector voltage of the amplitude limiter of FIG. 1, FIG. 3*d* shows the current including the ripple voltage across the RC network through a clipper stage which succeeds the amplitude limiter of FIG. 1, and FIG. 3*e* shows the collector current of one of the two transistors of the differential amplifier of FIG. 1 for separately separating the field-synchronizing pulses.

In FIG. 1 transistor 1 forms the amplitude limiter while the combination denoted by the reference numeral 2 is the clipper stage for clipping the line-synchronizing pulses. The reference numeral 3 denotes the differential amplifier which ensures that the field-synchronizing pulses are separated separately.

The video signal 4 is applied with positive-going line-synchronizing pulses through a resistor 5 to the emitter of NPN-transistor 1. The collector of this transistor is connected through an output resistor 6 to the supply voltage source which provides a supply voltage of $+V_v$ volt. The collector of the transistor 1 is connected to the input of the clipper stage 2. In the embodiment of FIG. 1 this clipper stage 2 comprises two transistors 7 and 8 arranged in Darlington configuration. As will be explained hereinafter this has been done to facilitate clipping of the field- synchronizing pulses with the aid of the differential amplifier 3. If this configuration is not used the clipper stage 2 may exclusively consist of the transistor 8, the collector of the transistor 1 being directly connected to the base of the transistor 8. In the case of FIG. 1, however, the collector of the transistor 1 is connected to the base of the transistor 7 which ensures that the control current is multiplied by a factor of $h_{fe}$ so that the collector current $i_c$ flowing through the transistor 8 is considerably amplified.

The emitter of the transistor 8 is connected through a resistor 9 of comparatively small value, for example, 260 ohms to the RC network 10 comprising a resistor 11 of, for example, 10 kΩ and a capacitor 12 of, for example, 0.2 $\mu$f. The RC network 11, 12 is the network mentioned in the preamble having a comparatively small time constant relative to the period of 50 Hz. of the field-synchronizing pulses occurring during the field-synchronizing interval. The resistor 9 has only a small value and serves to adjust the charge period of the capacitor 12 when the transistors 7 and 8 convey current. In fact, as will be described hereinafter with reference to FIGS. 2 and 3, the capacitor 12 is to be charged at a given speed which can be adjusted optionally with the aid of resistor 9.

The junction of the RC network 10 is connected through a resistor 13 of, for example, 10 kΩ to the base of the transistor 1. This junction is also connected to the base of a transistor 14 which forms part of the differential amplifier 3. This amplifier furthermore includes a transistor 15 and a transistor 16. The base of the transistor 16 is connected to the junction of a potential divider comprising the resistors 17 and 18, which potential divider is directly connected to the supply voltage source which provides the supply voltage of $+V_V$ Volt so that the collector current of the transistor 16 is determined thereby. Thus transistor 16 ensures in known manner that a constant current is applied to the differential amplifier 3, the control signals at the bases of the transistors 14 and 15 determining which part of this current will flow through the transistor 15 and which part will flow through the transistor 14. Finally the FIGURE shows that the collector of the transistor 15 includes a second RC network 19 comprising a capacitor 20 of, for example, 22 KpF and a resistor 21 of, for example, 6.2 kΩ. The RC network 19 serves to integrate the field-synchronizing pulses so that the integrated field-synchronizing signal 23' can be derived from the output terminal 22 which is connected to the collector of the transistor 15. This separated field-synchronizing signal 23' may be applied to a further clipper stage, if necessary, from which stage the clipped field-synchronizing pulses can then be derived.

The output terminal 22 is to be considered as a second output terminal of the synchronizing separator of FIG. 1 while the output terminal 23, which is connected to the collector of the transistor 8, forms the first output terminal from which the clipped line-synchronizing pulses 24 can be derived. To this end the collector of the transistor 8 is connected through an output resistor 25 to the supply voltage terminal of $+V_V$ Volt.

Figure 3:
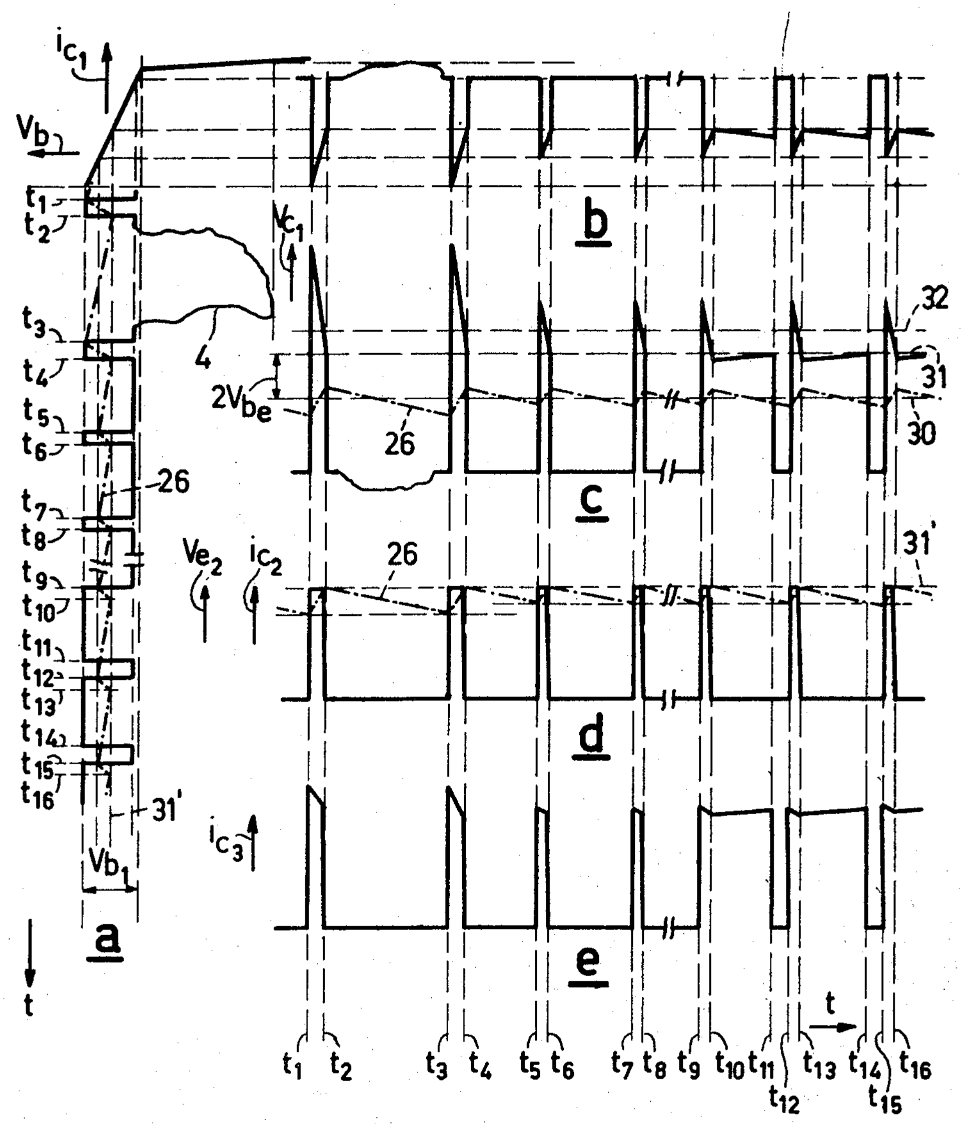

In order to explain the operation of the synchronizing separator according to the invention and to mention the drawbacks of the network 10 having a small time constant, FIGS. 2 and 3 show a few currents and voltages such as occur fully or partly in the separator of FIG. 1.

To this end FIG. 2 shows the voltage $V_{e2}$ as it occurs across the network 10 as a function of the time when capacitor 12 is not present, and it has also been assumed that resistor 13 has been detached from the junction of the resistors 9 and 11 and is connected to a fixed potential. The voltage $V_{e2}$ represents separated line, equalizing and field-synchronizing pulses. If only capacitor 12 is provided, a ripple voltage will be produced at the network 10 as is shown by the dot-and-dash line 26 in FIG. 2. This ripple voltage is not shown entirely correctly during the occurrence of the field-synchronizing pulses from the instant $t_{11}$ because the capacitor 12 is discharged across the resistor 11 at a constant slope. This slope is correctly shown during the periods $t_2 \rightarrow t_3$ being one line period and during the periods $t_4 \rightarrow t_5$, $t_6 \rightarrow t_7$ being half-line periods and is therefore not correctly shown during the periods $t_{11} \rightarrow t_{12}$ and $t_{14} \rightarrow t_{15}$ being periods during which inverted line synchronizing pulses occur. This has, however, been done for the sake of convenience in FIG. 2 because otherwise the effect of the invention would be difficult to show in the course of this description.

FIG. 2 shows in any case that the ripple voltage 26 across network 10 in the period during which line-synchronizing pulses always occur after one line period (the period $t_1 \rightarrow t_3$ being only shown in FIG. 2) has a mean value shown by the line 27. During the period $t_4 \rightarrow t_9$, being the period during which the equalizing pulses occur, the mean value of this ripple voltage is shown by the line 28 and during the period $t_9 \rightarrow t_{16}$ and following periods, being the field-synchronizing interval, the mean value of the ripple voltage would actually be shown by the level of the line 29. This is because capacitor 12 hardly gets an opportunity to discharge during the line flyback periods $t_{11} \rightarrow t_{12}$, $t_{14} \rightarrow t_{15}$, etc. This means that if the network 10 were provided in a manner as described in British Pat. specification No. 959,694, the mean threshold voltage for the amplitude limiter would greatly vary during the occurrence of the equalizing and field-synchronizing pulses which means that the amplitudes of the separated synchronizing pulses vary. This is fatal for the line synchronization around the occurrence of the field-synchronizing pulses since this results in the effect of skew of the image on the upper side as already stated in the preamble.

According to the principle of the invention, clipper stage 2 is provided between the amplitude limiter 1 and the network 10 to prevent this, and the base of the amplitude limiter 1 is also connected through the resistor 13 to the RC network 10. Thus it is not only achieved that the connection between the amplitude limiter and the RC network is shifted from its emitter to its base, but it is also achieved that due to including the clipper stage 2 the ripple voltage 26 across the network 10 has been rendered independent of the occurrence of the field-synchronizing pulses. This can be explained as follows.

FIG. **3*a* shows the input signal 4 as it is applied through the resistor 5 to the emitter of the transistor 1. This FIGURE also shows the $i_{c1}$-$V_b$ characteristic of the transistor 1. In this case it has been assumed that the value of the voltage at which the collector current $i_{c1}$ of the transistor 1 is cut off is given by $V_{b1}$. FIG. 3*a* also shows the ripple voltage 26 as it will eventually occur across the RC network 10. If the ripple voltage 26 were not superimposed on the input signal due to providing the resistor 13, the collector current $i_{c1}$ would have been cut off every time during the occurrence of the synchronizing pulses at the given amplitude of the signal 4 and the possibly applied bias. Due to the superimposition of the ripple voltage 26, the collector current $i_{c1}$ is now, however, only cut off at the instants $t_1$ and $t_3$ and this is no longer the case for all other instants as is clearly evident from FIG. 3*b*. Assuming the ripple voltage 26 to be shown indeed correctly, the collector current $i_{c1}$ shown in FIG. 3*b* will therefore flow which in turn results in a voltage drop across the resistor 6 so that the signal at the collector of the transistor 1 will have a waveform as shown by the voltage $V_{c1}$ in FIG. 3*c*. It is found from FIG. 3*c* that every time during the periods $t_1 \rightarrow t_2$, $t_3 \rightarrow t_4$, $t_5 \rightarrow t_6$, etc. up to and including the period $t_{15} \rightarrow t_{16}$ peak-shaped voltages always occur which render it possible to cause a collector current $i_{c2}$ as shown in FIG. 3*d* to flow through transistor 8 with the aid of the clipper stage 2. In fact, apart from the small voltage drop across resistor 9, transistor 8 has a ripple voltage at its emitter which is shown in FIG. 3*c* by the dot-and-dash line 26. The mean value of this ripple voltage is indicated approximately by the line 30. It is indicated approximately because, as is evident from FIG. 3*d*, also this mean value of the ripple voltage will be liable to changes as a result of the occurrence of the equalizing and field-synchronizing pulses. Since collector current can flow through the transistor 8 only when the voltage at its base exceeds the level indicated by the line 30 by $V_{be}$ volt (threshold voltage of the base-emitter junction, or junction voltage) the transistor 8 will be able to convey current only when the input signal at its base is $V_{be}$ volt higher than the mean level indicated by line 30. However, the signal $V_{c1}$ developed across the resistor 6 is active at the base of the transistor 7 so that also the junction voltage $V_{be}$ of the transistor 7 must be taken into account. Consequently, collector current will only flow through the transistor 8 when the voltage $V_{c1}$ is $2V_{be}$ volt higher than the level indicated by the line 30. This means that collector current $i_{c1}$ will flow through the transistor 8 only when the signal $V_{c1}$ at the base of the transistor 7 will have exceeded the level indicated by the line 31 in FIG. 3*c*. Furthermore assuming the transistor 8 to be saturated when the signal $V_{c1}$ exceeds the level indicated by the line 32, it can be seen that a strip is clipped off the signal $V_{c1}$ which is determined by the levels of lines 31 and 32. Therefore a collector current $i_{c2}$ and an emitter current corresponding thereto will flow through the transistor 8 as is shown in FIG. 3*d***.

FIG. **3*d* shows that actually only thin pulsatory current flow and that the broad field-synchronizing pulses do not occur any longer in the signal of FIG. 3*d*. This means that the signal $i_{c2}$ according to FIG. 3*d* will develop a signal 24 across the output resistor 25 which signal 24** not only always has the same amplitude but the width of which will vary only little during the occurrence of the field-synchronizing pulses. Consequently the skew of the image on the upper side of the screen is prevented. FIG. 3*d* also shows by way of the dot-and-dash line 26 of the ripple voltage which will occur across RC network 10. As a result of the comparatively small value of the resistor 9, capacitor 12 will always be charged up to the peak value of the signal when transistor 8 conveys current, which means that the peaks of the ripple voltage 26 actually adjoin the level of the line 31'. Since, however, the period between two line pulses (line period) is larger than the period between two equalizing pulses (half the line period) and the duration of the field-synchronizing pulses occurring in a field-synchronizing interval, the discharge of the capacitor 12 during the period $t_2 \rightarrow t_3$ will be larger than in the subsequent periods $t_4 \rightarrow t_5$, etc., $t_{10} \rightarrow t_{11}$ etc., respectively. As a result the ripple voltage 26 has a value at the instants $t_1$, $t_3$ which is less positive than that at the instants $t_5$, $t_7$, $t_9$, $t_{12}$, and $t_{15}$. That the ripple voltage 26 considered in FIG. 3*d* is correctly drawn in FIG. 3*a* may be evident from the fact that the level of the line 31' is also indicated in FIG. 3*a* and that the ripple voltage in both FIG. 3*a* and in FIG. 3*d* is situated in the same manner relative to the line 31'.

Since the ripple voltage in FIG. 3*d* lies below the line 31', the ripple voltage in FIG. 3*a* must also lie to the left of the line 31'. The input signal 4 is shown in FIG. 3*a* going in a negative direction because it is applied to the emitter of the transistor 1.

Since as already stated the collector current $i_{c1}$ arises as a result of the combined action of the applied video signal 4 and the ripple voltage 26, it can be seen that the peaks of the current $i_{c1}$ in FIG. 3*b* at the instants $t_1$ and $t_3$ are situated on a level other than at the instants $t_5$, $t_7$, $t_9$, $t_{12}$, and $t_{15}$. This affects the collector voltage $V_c$ which has different amplitudes at the said instants so that due to the small time constant of the network 10 the output signal of the amplitude limiter would also have a varying amplitude without the use of the clipper stage 2 which, as already stated in the preamble, would cause skew of the image on the upper side of the screen. This means that the clipper stage 2 performs a dual function:

1. Due to its clipper action between the levels 31 and 32 it ensures that the signal of FIG. 3*d* and the output signal 24 always have the same amplitude.
2. It separates the network 10 from the amplitude limiter 1.

Consequently, the peak currents which must charge the capacitor 12 always have the same amplitude. Also, there is no question of an interaction between network and amplitude limiter which is the case if the network 10 were incorporated in the emitter line of the amplitude limiter in the manner as described in British Pat. specification No. 959,694. Since with the occurrence of equalizing and field pulses the threshold voltage varies and hence the emitter current, which in turn results in a variation of the threshold voltage, the effect of the variation of the threshold voltage in such a circuit is much greater than is the case in the circuit of FIG. 1 of the present invention because the base current of the transistor 1 which also flows through the network 10 via the resistor 13 is negligible relative to the emitter current of the transistor 8. In fact, the last-mentioned emitter current is amplified many times relative to the base current of the transistor 1.

The fact that actually a ripple voltage 26 will eventually be active at the base of the transistor 1, even if a field-synchronizing pulse is not directly suppressed when switching on the circuit, whereby a switching-on-transient phenomenon occurs may be further explained with reference to FIG. 2. With reference to FIG. 2 it will be attempted to describe this switching-on-transient phenomenon. To this end the discharge of the capacitor 12 across the resistor 11 during the periods $t_{11} \rightarrow t_{12}$ and $t_{14} \rightarrow t_{15}$, respectively, is represented by an exaggerated slope and consequently also the charging of the capacitor 12 through the resistor 9 is represented in an accentuated manner for the periods $t_{12} \rightarrow t_{13}$ $t_{15} \rightarrow t_{16}$ which are periods during which field-synchronizing pulses are active. In any case it appears from this accentuated representation that a small collector current will start to flow in transistor 1 during the periods $t_{12} \rightarrow t_{13}$ and $t_{15} \rightarrow t_{16}$, respectively, because, as already considered for the ripple voltage 26 according to FIG. 3*d*, a more positive going direction of this ripple voltage at the base of transistor 1 will counter the cutoff of the collector current $i_{c1}$ as a result of the field-synchronizing pulses which are active at the emitter. It is true that the small peak currents which occur during these periods are initially not as large as is shown in FIG. 3*b*, but they will already slightly contribute to the fact that pulsatory small currents will start to flow through the transistor 8. These pulsatory currents have the result that the discharge of capacitor 12 across the resistor 11 can take place over a slightly longer period so that the condition of FIG. 3*d* is already slightly approximated. This longer period of discharge implies that also a larger charge must be applied through the resistor 9 so that the slope of the ripple voltage during the periods $t_{12} \rightarrow t_{13}$ and $t_{15} \rightarrow t_{16}$, respectively, increases which again results in slightly larger pulsatory currents, etc. Finally a balanced condition will have adjusted as is shown in FIG. 3*d*.

It is evident from the foregoing that only line-synchronizing pulses can be derived from the output terminal 23 because the field-synchronizing pulses have disappeared therefrom. Therefore steps must be taken to also separate the field-synchronizing pulses. As already described in the preamble this has been realized by means of the differential amplifier 3. A ripple voltage as shown in FIG. 3*c* is applied to the base of the transistor 14 from the differential amplifier 3 while the signal $V_{c1}$ is active at the base of the transistor 15. The result thereof is that a collector current $i_c$ will start to flow through transistor 15 as shown in FIG. 3*e*. During the periods $t_1 \rightarrow t_2$, $t_3 \rightarrow t_4$, $t_5 \rightarrow t_6$, $t_7 \rightarrow t_8$, $t_9 \rightarrow t_{11}$, $t_{12} \rightarrow t_{14}$ etc. the voltage $V_{c1}$ will in any case be situated quite some way above the level indicated by the line 30. Now the current flowing through the transistor 14 takes over the current flowing through the transistor 15 when the voltage at the base of the transistor 15 is slightly higher than that of the transistor 14. As is found from a consideration of FIG. 3*c* this is certainly the case in the above-mentioned periods and consequently the waveform of the collector current $i_{c3}$ is explained thereby.

The current $i_{c3}$ will result in a voltage across resistor 21 which is reversed in phase relative to the signal shown in FIG. 3*e* and the integrated field signal 23' arises at the output terminal 22 with the aid of the integration by means of capacitor 20.

It has been assumed that the input signal 4 has a given direct voltage level so that as shown in FIG. 3*a*, it is situated such that the peaks of its synchronizing pulses more or less coincide with the cutoff value $V_{f1}$ of transistor 1. If this might not be the case for example, when signal 4 is coupled to the base of transistor 1 through a capacitor, then the desired DC level for signal 4 can be ensured by means of an additional bias at the emitter of transistor 1.

Furthermore it is found from a consideration of FIG. 3*c* (line 32) that the upper sides of the pulses according to FIG. 3*d* have terminated before the instants $t_2$, $t_4$, $t_6$, $t_8$, $t_{10}$, $t_{13}$, and $t_{16}$ as a result of the sloping trailing edges of the peak pulses in FIG. 3*c*. As a result also the peaks of the ripple voltage 26 will perhaps be shifted to a slight extent which is, however, difficult to show in the various FIGURES and which makes little difference in practice.

Finally it is to be noted that although the embodiments of FIG. 1 show junction transistors it is alternatively possible to use so-called MOSFET (i.e., metal oixde semiconductor field effect transistor) transistors. This is particularly important for the amplitude limiter 1 because then there will flow no base current at all through the resistor 13 so that charging and discharging of the network 10 is only determined by the emitter current of the transistor 8 and the value of the resistor 11. The same applies for that matter to transistor 14 because also this transistor will partly withdraw a base current from the network 10 which in the case of a MOSFET transistor is not the case. Otherwise the operation of the circuit arrangement of FIG. 1 remains the same. It should, however, be noted that in the case of MOSFET transistors gate electrode should be read instead of base, source electrode instead of emitter and drain electrode instead of collector.

It is also to be noted that it is not necessary for the composite video signal to always comprise equalizing pulses. These equalizing pulses are absent, for example, in the British 405 line system.

The synchronizing separator of FIG. 1 is particularly suitable to be integrated in a semiconductor (I.C. circuit) since only two capacitors (12 and 20) are present which cannot be integrated in the semiconductor body. This is possible for all other components and this means that only two additional terminals (earth and supply voltage terminal $+V_v$ must always be present) are to be provided on the semiconductor body.

What is claimed is:

1. A circuit for separating line synchronization signals from a composite video signal comprising means for amplitude-limiting said video signals including an input means for receiving said video signal, a control electrode an output electrode; a clipper including a first transistor having an emitter, a base coupled to said output electrode, and a collector; and feedback means comprising a resistor-capacitor network having a time constant longer the line period and shorter than the field period of said video signal, a first resistor coupled between said emitter and said network, and a second resistor coupled between said network and said control electrode.

2. A circuit as claimed in claim 1 wherein said clipper further comprises a second transistor having an emitter coupled to said first transistor base, a base coupled to said output electrode, and a collector; and an output resistor coupled to said first transistor collector; whereby said transistors are coupled in a Darlington amplifier configuration.

3. A circuit as claimed in claim 1 further comprising means for separating the frame-synchronizing signals including a differential amplifier having a first input direct current coupled to said network, a second input direct current coupled to said output electrode, and an output means for supplying said separated frame synchronization signals.

4. A circuit as claimed in claim 3 wherein said differential amplifier comprises third and fourth transistors, each having emitter, base, and collector electrodes; said emitters of said third and fourth transistors being coupled together; said bases of said third and fourth transistors being said differential amplifier first and second inputs respectively; said fourth transistor collector being said output means.

5. A circuit as claimed in claim 4 further comprising a fifth transistor constant current source coupled to said third and fourth transistor emitters.

6. A circuit as claimed in claim 1 wherein said amplitude-limiting means comprises a sixth transistor having emitter, base, and collector electrodes being said input, control, and output electrodes respectively of said limiting means.

* * * * *

PO-1050
(5/69)

UNITED STATES PATENT OFFICE
CERTIFICATE OF CORRECTION

Patent No. 3,629,501 Dated December 21, 1971

Inventor(s) ADRIAAN CENSE

It is certified that error appears in the above-identified patent and that said Letters Patent are hereby corrected as shown below:

On the title page, change priority date "October 16, 1969" to -- October 21, 1968 --;

Signed and sealed this 30th day of May 1972.

(SEAL)
Attest:

EDWARD M.FLETCHER,JR.
Attesting Officer

ROBERT GOTTSCHALK
Commissioner of Patents